(12) United States Patent
Appelo

(10) Patent No.: US 10,092,872 B2
(45) Date of Patent: Oct. 9, 2018

(54) VALVE WITH SMALL VESSEL PENETRATION DIAMETER

(71) Applicant: ALSTOM Technology Ltd, Baden (CH)

(72) Inventor: Per-Erik Albert Appelo, Knoxville, TN (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/850,208

(22) Filed: Sep. 10, 2015

(65) Prior Publication Data
US 2016/0074798 A1 Mar. 17, 2016

Related U.S. Application Data

(63) Continuation-in-part of application No. 14/488,642, filed on Sep. 17, 2014.

(30) Foreign Application Priority Data

Sep. 4, 2015 (EP) .................................. 15183812

(51) Int. Cl.
 *B01D 46/00* (2006.01)
 *B01D 46/02* (2006.01)
 (Continued)

(52) U.S. Cl.
 CPC ......... *B01D 46/0068* (2013.01); *B01D 46/02* (2013.01); *B01D 46/4272* (2013.01); *F16K 1/307* (2013.01); *F16K 31/12* (2013.01)

(58) Field of Classification Search
 CPC ................... B01D 46/00; B01D 46/02; B01D 46/0067–46/0069; B01D 46/4272; F16K 1/307; F16K 21/12; F17C 13/04–13/045
 See application file for complete search history.

(56) References Cited

U.S. PATENT DOCUMENTS

| 865,479 A | 9/1907 | Cooper |
| 914,886 A | 3/1909 | Schreidt |

(Continued)

FOREIGN PATENT DOCUMENTS

| CN | 2191330 Y | 3/1995 |
| CN | 200961711 Y | 10/2007 |

(Continued)

OTHER PUBLICATIONS

Goyen CP Series—Close Pitched Valve—Manifold System, Rev. 01, Apr. 2015.

(Continued)

*Primary Examiner* — T. Bennett McKenzie
(74) *Attorney, Agent, or Firm* — GE Global Patent Operation; Rita D. Vacca

(57) ABSTRACT

The invention refers to an arrangement of a valve and a pressure vessel. The valve has a housing with at least an opening, a plunger slideably positioned in the housing, a control mechanism to cause plunger movement. The pressure vessel has an exterior surface with at least an opening. The valve is connected to the at least an opening of the pressure vessel. The plunger has at least a first part with a larger size and a second part with a smaller size. The first part of the plunger is positioned outside of the pressure vessel in all valve configurations.

15 Claims, 3 Drawing Sheets

(51) Int. Cl.
*F16K 1/30* (2006.01)
*F16K 31/12* (2006.01)
*B01D 46/42* (2006.01)

(56) References Cited

U.S. PATENT DOCUMENTS

| | | | |
|---|---|---|---|
| 926,400 A | 6/1909 | Freaney | |
| 1,548,093 A | 8/1925 | McCormick | |
| 2,476,400 A | 7/1949 | Berkholder | |
| 2,541,176 A | 2/1951 | Rockwell | |
| 3,253,615 A | 5/1966 | Armstrong | |
| 3,446,473 A | 5/1969 | Barker | |
| 4,190,230 A * | 2/1980 | Geissbuhler | B01D 46/0068 251/30.02 |
| 4,198,029 A | 4/1980 | Johnson | |
| 4,760,865 A * | 8/1988 | Rilett | F16K 1/44 137/588 |
| 4,793,589 A | 12/1988 | Eldredge et al. | |
| 5,002,594 A | 3/1991 | Merritt | |
| 5,042,775 A | 8/1991 | Willemsen | |
| 5,178,652 A | 1/1993 | Huettlin | |
| 5,524,903 A | 6/1996 | Messina | |
| 5,533,706 A | 7/1996 | Aurell | |
| 5,657,790 A * | 8/1997 | Mohn | B65D 83/42 137/270 |
| 5,887,973 A | 3/1999 | Ahman et al. | |
| 7,204,211 B2 | 4/2007 | Kenchington et al. | |
| 2005/0210842 A1 * | 9/2005 | McCausland | B01D 46/0068 55/302 |
| 2006/0123753 A1 | 6/2006 | Sugiura et al. | |
| 2008/0022641 A1 | 1/2008 | Engelland et al. | |
| 2010/0108927 A1 | 5/2010 | Perz et al. | |
| 2011/0000174 A1 | 1/2011 | Kapelarie et al. | |
| 2011/0206572 A1 | 8/2011 | McKenna et al. | |
| 2012/0073251 A1 | 3/2012 | Troxell et al. | |
| 2012/0138104 A1 | 6/2012 | Haynam et al. | |
| 2013/0153039 A1 | 6/2013 | Deubler | |
| 2013/0239802 A1 | 9/2013 | Troxell | |

FOREIGN PATENT DOCUMENTS

| | | |
|---|---|---|
| CN | 101293158 A | 10/2008 |
| CN | 201462062 U | 5/2010 |
| CN | 101879395 A | 11/2010 |
| CN | 202158221 U | 3/2012 |
| CN | 202460368 U | 10/2012 |
| EP | 1085244 A2 | 3/2001 |
| EP | 1131576 B1 | 6/2002 |
| EP | 1493480 A1 | 1/2005 |
| EP | 2 390 539 A1 | 11/2011 |
| FR | 2652631 A1 | 4/1991 |
| WO | 9119922 A1 | 12/1991 |
| WO | 9718026 A1 | 5/1997 |
| WO | 0129465 A1 | 4/2001 |
| WO | 2013/138092 A2 | 9/2013 |

OTHER PUBLICATIONS

Goyen CP Series—Close Pitched Valve—Aluminum Body X-Spool, Rev. 01, Apr. 2015.
Trimec Dust Filters Components: SPV High Efficiency Sonic Piston Valve, 2010, pp. 1-4, TRIMEC S.r.l.—Via Gramsci, 57-20032 Cormaho (Milano)—Italy. www.trimecvalves.com.
Solenoid Diaphragm Valves for Bag House (HJ/T284=600), State Environmental Protection Administration, Jul. 28, 2006, p. 63.
Non-Final Rejection towards related U.S. Appl. No. 13/892,683 dated Aug. 5, 2016.
U.S. Appl. No. 14/328,029, filed Jul. 10, 2014, Hjelmberg et al.
U.S. Appl. No. 13/892,938, filed May 13, 2013, Hjelmberg et al.
U.S. Appl. No. 13/892,683, filed May 13, 2013, Appelo.
U.S. Appl. No. 13/892,774, filed May 13, 2013, Appelo.
U.S. Appl. No. 15/353,097, filed Nov. 16, 2016, Appelo et al.
Non-Final Rejection towards U.S. Appl. No. 14/488,642 dated Mar. 1, 2017.
Final Rejection towards U.S. Appl. No. 14/488,642 dated Jul. 25, 2017.

* cited by examiner

VALVE WITH SMALL VESSEL PENETRATION DIAMETER

CROSS-REFERENCE TO RELATED APPLICATIONS

This application claims priority to and is a continuation-in-part of U.S. application Ser. No. 14/488,624; filed on Sep. 17, 2014, and EP Application No. 15183812.5, filed on Sep. 4, 2015, both of which are hereby incorporated in their entirety.

TECHNICAL FIELD

In general, the present disclosure relates to a cleaning valve useful for cleaning at least a portion of a filter unit, such as filter bags, arranged in a filter installation useful for filtering polluted gas passed therethrough. More specifically, the present disclosure relates to a relatively small vessel penetration diameter cleaning valve that requires less installation welding and a reduced pressure vessel wall thickness while not jeopardizing cleaning valve reliability or efficiency.

BACKGROUND

Commercial "bag house" type filter installations typically consist of a plurality of parallel filter units, each containing a plurality of parallel rows of vertically arranged filter elements in the form of filter bags. Each such filter bag has a top end opening. A gas polluted with particulates is channeled through the filter bags to filter and collect particulates entrained in the gas. Hence, upon filtering and collecting the particulates entrained in the gas, a "cleaned gas" is produced. More specifically, cleaned gas is produced by channeling a polluted gas into a filter installation for passage through one or more filter units for gas flow from an exterior surface of a plurality of filter bags through to an interior area within the filter bags via a flow path through the sides of the filter bags. As the polluted gas passes from the exterior surface of the filter bags through to the interior area within the filter bags, particulate pollutants entrained in the gas are filtered and collected forming dust cakes on the exterior surfaces of the filter bags. Hence, gas in the interior area of the filter bags is the so produced cleaned gas. Cleaned gas exits the interior areas of the filter bags via a top end opening in each such filter bag. Cleaned gas flows from the top end openings through an outlet duct common to the filter units. During operation of the filter installation, a negative pressure is typically generated by a fan arranged downstream of the filter installation to cause gas flow through the filter units and filter bags.

As noted above, dust and particulates entrained in the polluted gas are filtered by and collected on the exterior surfaces of the filter bags, thus forming dust cakes thereon. Cleaning of the filter bags to remove the dust cakes is necessary for effective and efficient equipment performance. Cleaning of the filter bags is accomplished using a pressure medium in the form of compressed is air pulses injected into the filter bags in a direction opposite to that of gas filtering. Rows of filter bags are cleaned successively using cleaning units arranged for each such given row. A cleaning unit cleans a row of filter bags by generating a compressed air pulse delivered substantially simultaneously to each filter bag in the given row. More specifically, each cleaning unit comprises a nozzle pipe arranged above and extending the length of the associated row of filter bags for cleaning. Each nozzle pipe typically has a plurality of vertically downwardly projecting pipe sockets connected thereto. Each pipe socket is positioned straight above a filter bag top end opening within the associated row. The function of these pipe sockets is to direct via nozzles compressed air pulses into the respective filter bag top end openings. The pipe sockets usually have a diameter of about 1.5 to 2 times greater than the diameter of the nozzle associated therewith. The nozzles associated therewith consist of circular holes of varying diameter formed in the nozzle pipe. The varying diameter of the circular holes along the nozzle pipe is determined empirically based on the total number of pipe sockets/nozzles, requiring a uniform distribution of compressed air pulsed therethrough. As such, circular holes arranged in the nozzle pipe are smaller or larger in diameter depending on the circular holes' distance from the nozzle pipe inlet. By so varying the diameter of the circular holes, a uniform distribution of compressed air pulsed therethrough is achieved.

In the cleaning of filter bags using a pulse of compressed air, a valve is temporarily opened to establish fluid flow between a compressed air tank or pressure vessel and the nozzle pipe. Upon fluid flow between the compressed air tank or pressure vessel and the nozzle, compressed air is pulsed through the nozzle pipe and its associated pipe sockets and nozzles. As such, a compressed air pulse is supplied to each of the filter bags in the associated row of filter bags. Compressed air pulses supplied to the filter bags dislodge dust and particulates that collect and cake in and on the walls of the filter bags. Dust cakes formed on the filter bags are thereby loosened by the flow of compressed air from the interior areas of the filter bags, through the filter bag side walls, to an area in the filter unit exterior thereto. The resultant loosened dust cakes fall off the exterior of the filter bags for hopper collection.

In operating a cleaning unit, it is essential that the above-described pulse valve delivers a cleaning pulse of compressed air at a relatively high pressure with a relatively low consumption of compressed air. Pulse valves function by a cavity behind a plunger or membrane emptying through either a solenoid valve or a pilot valve, whereby the plunger or membrane is displaced by the differential pressure between the pressure vessel or air tank pressure on one side of the plunger or membrane and the cavity pressure on the other side of the plunger or membrane. The plunger or membrane undergoes considerable acceleration and achieves considerable velocity upon displacement as a result of this pressure differential. Eventually the plunger or membrane impacts an end position with very high momentum. The plunger or membrane impacting the end position with very high momentum creates a significantly loud noise upon impact. Likewise, when the plunger or membrane impacts the end position, such impact creates relatively high mechanical stresses. Mechanical stresses on the valve shorten the operational life expectancy of the valve and add to the system's operation costs when performance is hampered and/or replacement is necessary. Installation and replacement of valves on compressed air tanks or pressure vessels typically requires bolting of the valve to a flange welded to the compressed air tank or pressure vessel. Welding of the flanges to the compressed air tank or pressure vessel is relatively costly due to the relatively large amount of welding required therefor. Bolting valves to tanks or vessels requires a relatively large valve outer diameter to accommodate the bolts. As such, these relatively large diameter valves must sometimes be staggered in their placement in order to accommodate their larger size. Such is especially true for smaller valve pitches, i.e., smaller distances between valves. Staggered placement of valves is also relatively costly. Hence, to increase system performance and decrease system operational costs, a valve with decreased mechanical stresses, decreased installation and replacement cost, and increased operational life expectancy is desired.

SUMMARY

In view of the above, disclosed herein is a pulse valve with a relatively small vessel penetration diameter. Also disclosed herein is a method of using the subject pulse valve with relatively small vessel penetration diameter for pulsed compressed air cleaning of a plurality of filter elements, such as filter bags. The subject valve requires decreased or no installation welding thereby reducing costs associated therewith. Also, the subject valve has a relatively small valve housing diameter since the valve housing diameter does not have to accommodate for bolting thereof, thus reducing valve spacing requirements and costs associated therewith. The relatively small vessel penetration diameter of the subject valve is important in that it reduces tank or vessel thickness requirements thereby also reducing costs associated with using thicker walled compressed air tanks or pressure vessels. Larger sized plunger extension tabs of the subject valve also provides for high performance filter cleaning. As such, the subject pulse valve with a relatively small vessel penetration diameter is useful for efficient pulsed compressed air cleaning of at least a portion of a filter unit.

The subject pulse valve with relatively small vessel penetration diameter comprises a housing with a plunger slideably positioned therein. The housing is arranged in an opening of a pressure vessel, or compressed air tank, containing compressed air having a pressure of about 10 pounds per square inch (psi) to about 145 psi, or about 60 psi. The housing is air tightly fixed in an opening of the pressure vessel by engagement of a base thereof within a free end of a nozzle pipe arranged within the pressure vessel. As such, the base is sized with a relatively small vessel penetration diameter suitable for engagement thereof within a free end of the nozzle pipe. Once engaged within the free end of the nozzle pipe, one or more openings formed within the housing allow for a flow of compressed air to pass from the pressure vessel through the housing and into the fluidly connected nozzle pipe. Compressed air flowing through the nozzle pipe effectively cleans at least a portion of a filter unit when the plunger is in a first "open" position.

A fluid supply is fluidly connected to or on the housing to supply a fluid, such as air, to an interior vault or cavity within the housing. Filling of the interior vault with air causes a downward movement of the plunger within the housing to a second "closed" position. When in the second closed position, the plunger blocks the one or more openings in the housing and thus blocks the flow of compressed air from the compressed air tank or pressure vessel to the nozzle pipe. Compressed air in the pressure vessel or compressed air tank has a pressure of about 10 psi to about 145 psi, or about 60 psi. When the plunger is in the first open position, the fluid pressure within the interior vault or cavity of the housing is significantly less than that of the compressed air within the pressure vessel. When the plunger is in the second closed position, the fluid pressure within the interior vault or cavity of the housing is equal or greater than that of the compressed air within the pressure vessel and significantly greater than the pressure in the nozzle pipe.

A dampening mechanism, such as one or more cushions, is arranged inside the housing to reduce or dampen the impact between the housing and the plunger upon movement of the plunger into the first open position. Cushioning the impact between the housing and the plunger reduces mechanical stresses caused by such impacts and improves valve reliability even with higher pressure vessel or tank pressure. The internal dampening mechanism likewise reduces the impact noise of the plunger upon displacement or movement of the plunger into the first open position. In addition to the dampening mechanism, fluid within the interior vault or cavity of the housing provides a cushioning effect that reduces impact and impact noise of the plunger upon movement thereof into the first open position.

A method of using the subject pulse valve device for cleaning at least a portion of a filter unit comprises reducing fluid pressure within an interior vault or cavity of a valve housing to cause pressure differential displacement or movement of a plunger into a first open position allowing for a flow of compressed air from a pressure vessel or compressed air tank through the valve housing to a nozzle pipe in fluid connection with a filter unit, thereby cleaning the filter unit with a pulse of compressed air. Increasing fluid pressure within an interior vault or cavity of the valve housing likewise causes pressure differential displacement or movement of the plunger into a second closed position blocking flow of compressed air from the pressure vessel or compressed air tank and hence from the nozzle pipe, until a further pulse cleaning of the filter unit is indicated by buildup of a filter dust cake.

For purposes of this method, the compressed air in the pressure vessel has a pressure of about 10 psi to about 145 psi, or about 60 psi. When the plunger is in the first open position, the fluid pressure within the interior vault of the housing is significantly less than that of the compressed air within the pressure vessel or compressed air tank. When the plunger is in the second closed position, the fluid pressure within the interior vault of the housing is equal or greater than that of the compressed air within the pressure vessel and significantly greater than that of the nozzle pipe. Pressure within the housing is controlled using a solenoid valve or the like for purposes of the subject method to control fluid flow into the interior vault of the housing to thus control the pressure differential between that of the interior vault and that of the pressure vessel or compressed air tank.

The subject method further comprises providing a dampening mechanism within the housing to reduce or cushion the impact between the housing and the plunger upon movement of the plunger into the first open position. Providing a dampening mechanism as herein described also reduces the impact noise of the plunger with the housing upon movement of the plunger into the first open position. Fluid within the interior vault of the housing likewise provides a cushioning effect to reduce impact and impact noise of the plunger upon movement of the plunger into the first open position.

The subject pulse valve device and method for using the same to clean at least a portion of a filter unit, such as filter bags, arranged in a filter installation to filter polluted gas passed therethrough includes among other features noted, a relatively small vessel penetration diameter, and no weld or low weld installation, to reduce costs while not jeopardizing reliability or efficiency.

In summary, a valve is provided useful for pulsed compressed air cleaning of a filter unit. The valve comprises a housing with a plunger slideably positioned therein arranged in an opening of a pressure vessel containing compressed air and removably threadedly fixed to a nozzle pipe for a fluid connection thereto, one or more openings in the housing for the flow of compressed air from the pressure vessel through the housing to the nozzle pipe useful for cleaning at least a portion of a filter unit when the plunger is in an open position, and a fluid supply on the housing for control of a fluid to a vault within the housing to cause movement of the plunger to a closed position for blocking the one or more openings to block the flow of compressed air from the pressure vessel to the nozzle pipe. The compressed air in the pressure vessel has a pressure of about 10 psi to about 145 psi. When the plunger is in the closed position, the fluid pressure within the vault of the housing is equal or greater than that of the compressed air within the pressure vessel and significantly greater than that of the nozzle pipe. When the plunger is in the open position, the fluid pressure within the vault of the housing is less than that of the compressed air within the pressure vessel. Also, the housing further comprises a dampening mechanism to reduce impact between the housing and the plunger upon movement of the plunger into the open position. The dampening mechanism also reduces impact noise of the plunger upon movement of the plunger into the open position. Further, a valve is either provided on the housing or connected to the housing through tubing. As such, a solenoid valve is provided on the housing to control fluid flow to and from the vault of the housing.

In summary, a method is provided for using a valve for cleaning at least a portion of a filter unit. The method comprises increasing fluid pressure within a vault of a valve housing causing pressure movement of a plunger into a closed position blocking flow of compressed air from a pressure vessel through to a nozzle pipe, and decreasing fluid pressure within a vault of a valve housing causing pressure movement of the plunger into an opened position allowing flow of compressed air from a pressure vessel through to a nozzle pipe in fluid connection with a filter unit thereby pulse cleaning the filter unit. The compressed air in the pressure vessel has a pressure of about 10 psi to about 145 psi. When the plunger is in the closed position, the fluid pressure within the vault of the housing is equal to or greater than that of the compressed air within the pressure vessel, and significantly greater than that of the nozzle pipe. When the plunger is in the open position, the fluid pressure within the vault of the housing is less than that of the compressed air within the pressure vessel. A dampening mechanism is also provided to reduce impact between the housing and the plunger upon movement of the plunger into the open position. The dampening mechanism is also used to reduce impact noise of the plunger upon movement of the plunger into the open position. A valve is provided on the housing for controlling movement of the plunger. As such, a solenoid valve is provided on the housing or connected to the housing through tubing to control fluid flow to and from the vault to control movement of the plunger. By controlling movement of the plunger, the solenoid valve on the housing also controls flow of compressed air to the nozzle pipe and cleaning of the filter unit.

BRIEF DESCRIPTION OF THE DRAWINGS

The present invention will now be described in more detail with reference to the accompanying drawings.

DETAILED DESCRIPTION

Figure 1:
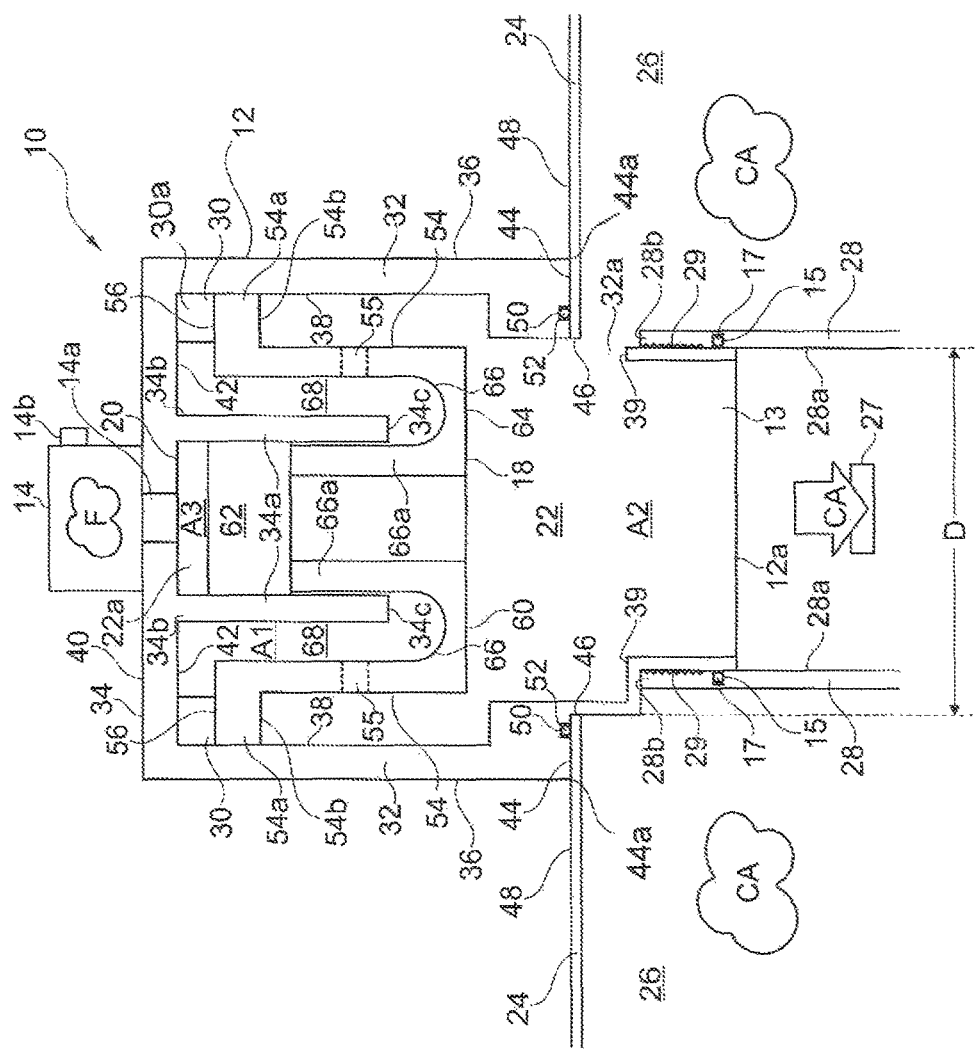
FIG. 1 is a schematic side cross-sectional view of a pulse valve device according to the present invention with a plunger in a first "open" position.

A pulse valve 10 with a relatively small vessel penetration diameter D for arrangement in tank or pressure vessel 24 opening 46 and suitably sized for installation within a nozzle pipe 28 arranged in tank or pressure vessel 24 is useful for effective compressed air pulsed cleaning of a plurality of filter elements, such as filter bags, in a filter unit 27. Pulse valve 10 requires decreased installation or replacement welding reducing costs associated therewith, decreased vessel penetration diameter D reducing valve spacing requirements on pressure vessel 24 and reducing pressure vessel 24 thickness requirements thereby reducing costs associated therewith, and relatively large extended tabs 54a on plunger 18 enabling a relatively small vessel penetration diameter D, as is described herein. As illustrated in FIG. 1, the subject pulse valve 10 comprises a valve housing 12. Valve housing 12 is manufactured of a sturdy natural, e.g., iron, aluminum, or other metal, or synthetic, e.g., plastic, resin or other polymer, material suitably rigid and durable for robust industrial uses and forces. Housing 12 is formed with sides 32. Sides 32 include one or more openings 32a therethrough. Sides 32 also include an exterior surface 36 and an interior surface 38. Top 34 of housing 12 includes an exterior surface 40 and an interior surface 42. Extending from interior surface 42 of top 34 is a cylinder member 34a. Cylinder member 34a is formed with an attached end 34b opposite a free end 34c. Extending from interior surface 42 between side 32 interior surface 38 and cylinder member 34a are one or more dampening mechanisms or cushions 30. Cushions 30 may be manufactured from natural or synthetic rubber, polyurethane, silicone or a like flexible material capable of providing cushioning effects upon repeated impact between solid surfaces. Valve housing 12 also includes a base 12a defining an opening 13. Base 12a is tubular and sized to threadedly engage interior surface 28a of nozzle pipe 28. As such, threads 29 are provided on each the exterior surface 36 of housing 12 near base 12a and the interior surface 28a of nozzle pipe 28 near free end 28b for a removably interlocking connection therebetween. On interior surface 28a of nozzle pipe 28 abutting exterior surface 36 of housing 12, is a channel 15 with a pliable material 17, such as an O-ring, therein to ensure an air tight seal between housing 12 and nozzle pipe 28. In removably engaging housing 12 and nozzle pipe 28, valve 10 is positioned within an opening 46 of pressure vessel 24 with base lip 44 of valve housing 12 abutting exterior surface 48 of pressure vessel 24. In base lip 44 of valve housing 12 is a channel 50 with a pliant sealing member 52 therein creating an airtight seal between exterior surface 48 of pressure vessel 24 and base lip 44 of valve housing 12. Valve 10 is sized so that the distance between opposed outer edges 44a of base lips 44 is reduced in size as compared to a like valve requiring bolting, to allow for linear valve placement rather than requiring staggered valve placement for filter cleaning. Within interior area 22 of housing 12 extending from interior surface 38 of walls 32 are valve seats 39. Valve seats 39 abut a portion of base 60 when plunger 18 is in a second closed position as will be described in more detail below.

Slideably positioned within interior area 22 of housing 12 is a plunger 18. Plunger 18 is likewise manufactured of a sturdy natural, e.g., iron, aluminum, or other metal, or synthetic, e.g., plastic, resin or other polymer, material suitably rigid and durable for robust industrial uses and forces. Extended tabs 54a of sides 54 of plunger 18 contact interior surfaces 38 of sides 32 of valve housing 12 for an air tight seal therebetween. With an air tight seal between extended tabs 54a and interior surfaces 38, one or more air holes 55 are provided through sides 54 of plunger 18. In addition to or as an alternative to air holes 55 through sides 54 of plunger 18, air may be allowed to leak between extended tabs 54a and surfaces 38, as explained in more detail below. Extending between sides 54 of plunger 18 opposite free ends 56 of extended tabs 54a is a base 60 with a center plug portion 62 extending upwardly therefrom cylinder portion 66a into interior vault 22a of valve housing 12. Plug portion 62 is manufactured to extend from plunger 18 interior surface 66 on cylinder portion 66a away from opposed exterior surface 64 of base 60. Interior surface 66 of plunger 18 is in fluid communication with interior area 68 of plunger 18. Between interior surface 66 of plunger 18 and interior surface 42 of top 34 of valve housing 12 is interior area 68. The area A1 of interior area 68 varies as plunger 18 moves or slides within valve housing 12. The area A1 of interior area 68 is minimized when base 60 of plunger 18 moves toward top 34 of valve housing 12 for contact of free ends 56 with pliable dampening mechanisms 30 at interior surface 42 of top 34 of valve housing 12. Air in interior area 68 flows from decreasing area A1 of interior area 68 through air holes 55 and/or leaks around extended tabs 54a into increasing area A2 of interior area 22. In this first "opened" position of FIG. 1, free ends 56 of sides 54 contact pliable dampening mechanisms 30 and plug portion 62 slides within interior vault 22a of valve housing 12 to abut sealing seat 20 of valve housing 12 causing fluid "F" to flow from interior vault 22a through solenoid valve 14 integrally formed with, securely affixed to, or connected through tubing (not shown) to valve housing 12. In this first "open" position, interior vault 22a is an area A3 of low pressure causing plug portion 62 to slide into contact with sealing seat 20.

Figure 2:
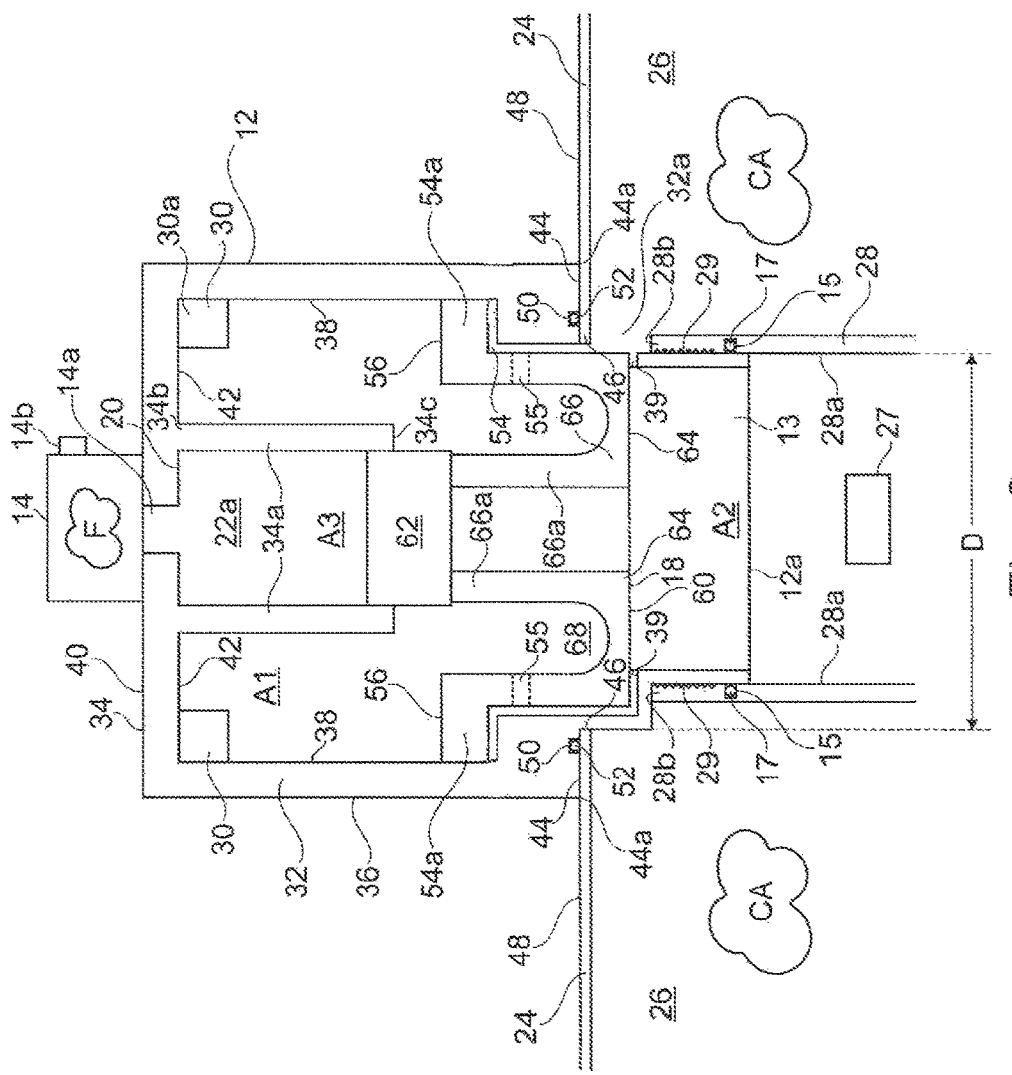
FIG. 2 is a schematic side cross-sectional view of a pulse valve device according to the present invention with a plunger in a second "closed" position.
Figure 3:
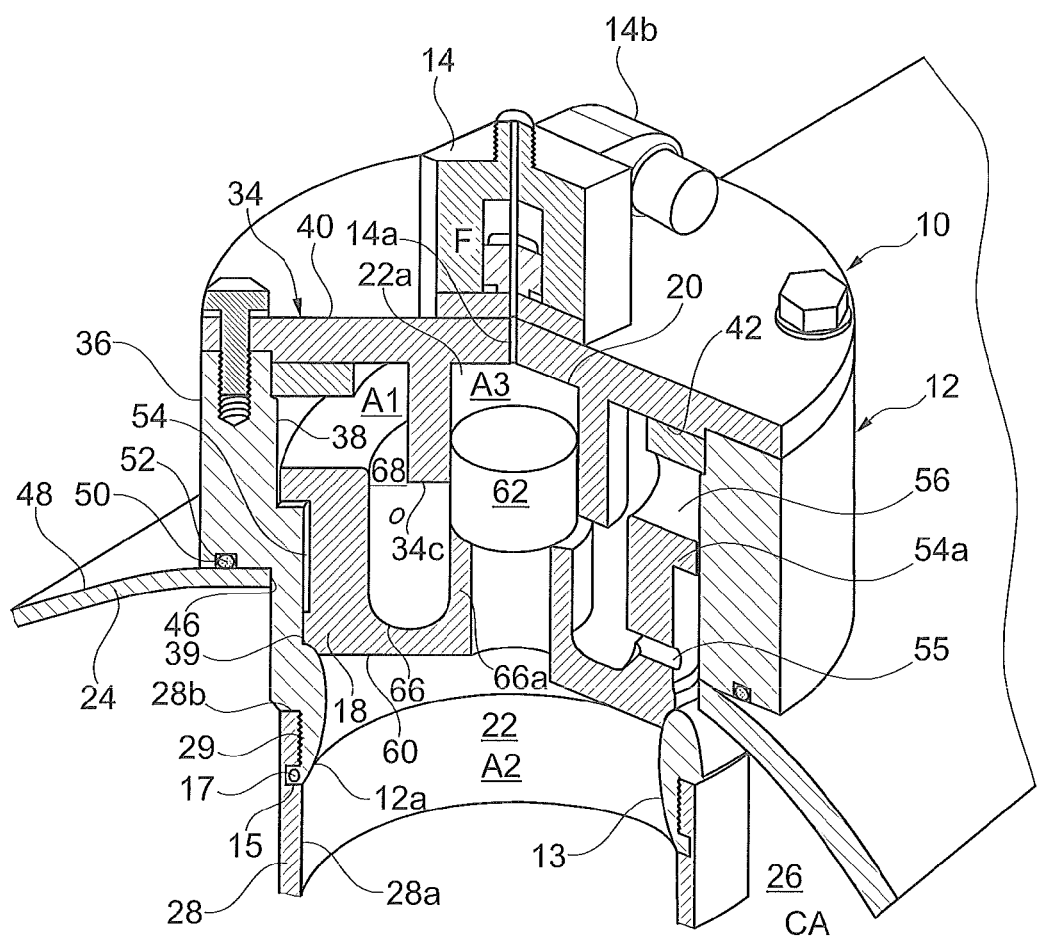
FIG. 3 is a schematic perspective view partially in section of a pulse valve device according to the present invention.

The area A2 of interior area 22 is maximized when pressure within internal vault 22a is decreased causing a flow of fluid F from internal vault 22a outwardly through passage 14a and solenoid valve 14. As such, plug portion 62 of plunger 18 moves inwardly into interior vault 22a and into contact with sealing seat 20 in a first open position which allows a higher pressure flow of compressed air CA to flow from compressed air tank 24 through one or more openings 32a of housing 12 and into fluidly connected nozzle pipe 28. Now, referring to FIG. 2, the area A2 of interior area 22 is minimized when pressure within area A3 of internal vault 22a is increased causing a flow of fluid F from a fluid source 14b through solenoid valve 14 and passage 14a into internal vault 22a. As such, plug portion 62 of plunger 18 moves outwardly from sealing seat 20 into interior vault 22a into a second closed position which blocks the now lower pressure compressed air CA from flowing from the compressed air tank or pressure vessel 24 through one or more openings 32a of housing 12 and into fluidly connected nozzle pipe 28. As such, air in decreasing area A2 of interior area 22 flows through air holes 55 and/or leaks around extended tabs 54a into increasing area A1 of interior area 68. In summary, upon outward movement of plug portion 62 away from sealing seat 20 in interior vault 22a, compressed air CA from pressure vessel 24 is blocked by plunger 18 from flowing through one or more openings 32a in sides 32 of valve housing 12 into area A2 of internal area 22. Fluidly connected to internal area 22 is housing base 12a opening 13. Base 12a of housing 12 is fluidly connected to nozzle pipe 28. As such, in this second "closed" position, plunger 18 is positioned within internal area 22 of valve housing 12 to block compressed air CA flow through one or more openings 32a and into fluidly connected nozzle pipe 28. Likewise, plug portion 62 moves a distance from sealing seat 20 of interior vault 22a upon fluid F flow from solenoid valve 14 into interior vault 22a via passage 14a. In this second closed position, the compressed air CA pressure inside interior area 26 of pressure vessel 24 and inside interior area 22 of valve housing 12 are less than that of the fluid F pressure inside interior vault 22a.

A method of using the subject pulse valve 10 for cleaning at least a portion of a filter unit 27 comprises decreasing fluid F pressure within interior vault 22a of a valve housing 12 to cause pressure movement of a plunger 18 into a first "open" position allowing flow of compressed air CA from a pressure vessel or compressed air tank 24 through valve housing 12 and into a nozzle pipe 28 in fluid connection therewith. This pulse of compressed air CA into nozzle pipe 28 cleans the filter unit 27 from dust cake build up for hopper collection. Increasing fluid F pressure within interior vault 22a of the valve housing 12 likewise causes pressure movement of the plunger 18 into a second "closed" position blocking flow of compressed air CA from the pressure vessel or compressed air tank 24 to the fluidly connected nozzle pipe 28 until the next filter unit 27 cleaning.

For purposes of this method, the compressed air CA in the pressure vessel 24 has a pressure of about 10 psi to about 145 psi, or about 60 psi. When the plunger 18 is in the first open position, the fluid F pressure within the interior vault 22a of the valve housing 12 is significantly less than that of the compressed air CA within the pressure vessel or compressed air tank 24. When the plunger 18 is in the second closed position, the fluid F pressure within the interior vault 22a of the valve housing 12 is equal to greater than that of the compressed air CA within interior 26 of pressure vessel 24, and significantly greater than that of the nozzle pipe 28. Pressure within the valve housing 12 interior vault 22a is controlled using a solenoid valve 14 or the like for purposes of the subject method to control fluid F flow into and out of the interior vault 22a of the valve housing 12 and to thus control the movement of plunger 18 and compressed air CA flow to nozzle pipe 28.

The subject method further comprises providing a dampening mechanism 30a comprising one or more cushions 30, within the valve housing 12 to reduce or cushion the impact between the valve housing 12 interior surface 42 and the plunger 18 free ends 56 upon movement of the plunger 18 into the first open position. Providing cushions 30 as herein described also reduces the impact noise of the plunger 18 with the valve housing 12 upon movement of the plunger 18 into the first open position.

Additionally, dampening mechanism 30a enables the use of an increased tank pressure for increased filter area cleaning per cleaning valve without jeopardizing cleaning valve reliability. Without dampening mechanism 30a, increased tank pressure jeopardizes cleaning valve reliability due to damage or wear caused by increased mechanical stresses from the resultant higher velocity impact of the plunger 18 with the valve housing 12. Dampening mechanism 30a cushions the impact of plunger 18 within valve housing 12 thus lessening mechanical stresses of such impacts and reducing damage or wear to the cleaning valve 10. Hence, with dampening mechanism 30a, cleaning valve 10 reliability is not jeopardized with increased tank or pressure vessel 24 compressed air CA pressure.

Therefore in the arrangement of a valve 10 and pressure vessel 24, the valve (10) has the housing 12 with at least an opening 32a, the plunger 18 slideably positioned in the housing 12, the control mechanism 62,20, 14 to cause plunger movement. The pressure vessel 24 has an exterior surface 48 with at least an opening 46. The valve 10 is connected to the at least an opening 46 of the pressure vessel 24. The plunger 18 has at least a first part with a larger size and a second part with a smaller size.

The first part of the plunger is positioned outside of the pressure vessel 24 in all valve configurations.

For this reason, the housing 12 has a cavity with a first cavity part of larger size and a second cavity part of smaller size, the housing 12 also has a first outer part with larger size and a second outer part with smaller size. The first cavity part is completely included in the first outer part of the housing 12.

Typically housing 12 is cylindrical, therefore the larger or smaller size indicates a larger or smaller diameter of different parts of the housing 12. It is anyhow clear that the cross section of the housing 12 can be any or the cross section of different parts of the housing 12 can be any; the size has to be thus intended as the size of the cross section of the different parts of the housing 12.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. An arrangement of a valve and a pressure vessel, comprising:
   the valve comprising a housing with at least an opening,
      a plunger comprising at least a first part with a larger size and a second part with a smaller size, slideably positioned in the housing, and a control mechanism comprising an interior vault defined by a wall extending interiorly within the housing from a top of the housing and distanced from interior surfaces of sides of the housing, and a center plug portion slideably arranged within the interior vault to cause plunger movement, connected to at least an opening of the pressure vessel; and
   the pressure vessel with an interior area of compressed air inside the pressure vessel, wherein when the valve connected to the pressure vessel is in a closed position, the at least a first part with a larger size of the plunger is positioned outside of the at least an opening and the interior area of the pressure vessel, and the second part with a smaller size extends beyond the at least an opening of the pressure vessel into the interior area of the pressure vessel.

2. The arrangement of claim 1, wherein the housing includes a base, and the pressure vessel includes a nozzle pipe arranged within the pressure vessel connected to the base of the housing.

3. The arrangement of claim 2, wherein the base extends from the housing.

4. The arrangement of claim 2, wherein the base is tubular and sized to threadedly engage an interior surface of the nozzle pipe.

5. The arrangement of claim 1, wherein the housing further comprises a cushion dampening mechanism to reduce impact and reduce impact noise between the housing and the plunger upon movement of the plunger into an open position within the housing.

6. The arrangement of claim 1, wherein the control mechanism further comprises a control valve on the housing for control of a fluid flow to and from the interior vault of the housing.

7. The arrangement of claim 1, wherein the plug portion is centered within the plunger.

8. The arrangement of claim 1, wherein the plug portion is in slideable contact with a sealing seat.

9. A valve comprising:
   a housing with a first outer part with larger size, a second outer part with smaller size, a cavity with a first cavity part of larger size and a second cavity part of smaller size, with the first cavity part completely included in the first outer part of the housing, and at least an opening;
   a plunger with at least a first part with a larger size and a second part with a smaller size slideably positioned in the housing; and
   a control mechanism comprising an interior vault within the first cavity part of the cavity defined by a wall extending interiorly within the housing from a top of the housing and distanced from interior surfaces of sides of the housing, and a plug portion extending from a cylinder portion of the second part of the plunger slideably arranged within the interior vault, a sealing seat and a control valve to cause plunger movement.

10. The valve of claim 9, wherein the plunger is slideably positioned in at least the first cavity part of the housing.

11. The valve of claim 9, wherein the second part of the plunger is configured for entering the second cavity part of the housing.

12. The valve of claim 9, further comprising a base, which extends from the housing.

13. The valve of claim 9, further comprising a tubular base sized to threadedly engage an interior surface of a nozzle pipe.

14. The valve of claim 9, wherein the housing further comprises a cushion dampening mechanism to reduce impact and reduce impact noise between the housing and the plunger upon movement of the plunger into an open position within the housing.

15. The valve of claim 9, wherein the control valve controls a fluid flow to and from the interior vault of the housing.

* * * * *